(12) United States Patent
Zhang et al.

(10) Patent No.: US 12,085,673 B2
(45) Date of Patent: Sep. 10, 2024

(54) DISTRIBUTED LiDAR SYSTEMS

(71) Applicant: Innovusion Ireland Limited, Los Altos, CA (US)

(72) Inventors: Rui Zhang, Los Altos, CA (US); Jim Li, Los Altos, CA (US); Yufeng Li, Los Altos, CA (US); Yimin Li, Los Altos, CA (US); Junwei Bao, Los Altos, CA (US)

(73) Assignee: Seyond, Inc., Sunnyvale, CA (US)

( * ) Notice: Subject to any disclaimer, the term of this patent is extended or adjusted under 35 U.S.C. 154(b) by 998 days.

(21) Appl. No.: 16/282,000

(22) Filed: Feb. 21, 2019

(65) Prior Publication Data

US 2019/0265339 A1    Aug. 29, 2019

Related U.S. Application Data

(60) Provisional application No. 62/634,593, filed on Feb. 23, 2018.

(51) Int. Cl.
*G01S 7/481* (2006.01)
*G01S 17/08* (2006.01)
(Continued)

(52) U.S. Cl.
CPC .......... *G01S 7/4814* (2013.01); *G01S 7/4813* (2013.01); *G01S 7/4817* (2013.01); *G01S 7/4818* (2013.01);
(Continued)

(58) Field of Classification Search
CPC .... G01S 7/4814; G01S 7/4813; G01S 7/4817; G01S 7/4818; G01S 17/08; G01S 17/87;
(Continued)

(56) References Cited

U.S. PATENT DOCUMENTS 3,897,150 A    7/1975 Bridges et al.
4,464,048 A    8/1984 Farlow
(Continued)

FOREIGN PATENT DOCUMENTS

CA    2629319 A1    7/2007
CN    1677050 A    10/2005
(Continued)

OTHER PUBLICATIONS

Wikipedia contributors. "Optical fiber connector." Wikipedia, The Free Encyclopedia. Wikipedia, The Free Encyclopedia, May 21, 2022. Web. Aug. 12, 2022. (Year: 2022).*
(Continued)

*Primary Examiner* — Luke D Ratcliffe
*Assistant Examiner* — Sanjida Naser
(74) *Attorney, Agent, or Firm* — MASCHOFF BRENNAN; Liang Huang; Elaine K. Lee

(57) ABSTRACT

In accordance with some embodiments, a light detection and ranging (LiDAR) system comprises: a control system housing; a first LiDAR head housing separate and distinct from the control system housing; a light source within the control system housing, the light source configured to produce a first pulse signal; a light detector within the control system housing configured to detect a first return pulse signal associated with the pulse signal; a first pulse steering system within the first LiDAR head housing, the first pulse steering system configured to direct the first pulse signal in a first direction; a first fiber configured to carry the first pulse signal from the light source to the first pulse steering system; and a second fiber configured to carry a first returned pulse signal from the first LiDAR head housing to the light detector.

24 Claims, 5 Drawing Sheets

(51) Int. Cl.
    *H01S 3/08* (2023.01)
    *H01S 3/10* (2006.01)
    *H01S 3/102* (2006.01)
    *H01S 3/23* (2006.01)
    *H01S 3/04* (2006.01)

(52) U.S. Cl.
    CPC .......... *G01S 17/08* (2013.01); *H01S 3/08013*
        (2013.01); *H01S 3/10023* (2013.01); *H01S*
        *3/1024* (2013.01); *H01S 3/2316* (2013.01);
                                    H01S 3/04 (2013.01)

(58) Field of Classification Search
    CPC ............. H01S 3/08013; H01S 3/10023; H01S
                3/1024; H01S 3/2316; H01S 3/04
    See application file for complete search history.

(56) References Cited

U.S. PATENT DOCUMENTS

| | | |
|---|---|---|
| 4,676,586 A | 6/1987 | Jones et al. |
| 4,923,263 A | 5/1990 | Johnson |
| 5,006,721 A | 4/1991 | Cameron |
| 5,012,079 A | 4/1991 | Singh et al. |
| 5,157,451 A | 10/1992 | Taboada et al. |
| 5,173,797 A | 12/1992 | Zedekar et al. |
| 5,185,736 A * | 2/1993 | Tyrrell .................. H04J 3/1611 370/359 |
| 5,254,893 A | 10/1993 | Ide |
| 5,319,434 A | 6/1994 | Croteau et al. |
| 5,369,661 A | 11/1994 | Yamaguchi et al. |
| 5,442,358 A | 8/1995 | Keeler |
| 5,504,731 A | 4/1996 | Lee et al. |
| 5,546,188 A | 8/1996 | Wangler et al. |
| 5,579,153 A | 11/1996 | Laming et al. |
| 5,657,077 A | 8/1997 | Deangelis |
| 5,793,491 A | 8/1998 | Wangler et al. |
| 5,838,239 A | 11/1998 | Stern et al. |
| 5,864,391 A | 1/1999 | Hosokawa et al. |
| 5,920,140 A | 7/1999 | Nakagishi et al. |
| 5,926,259 A | 7/1999 | Bamberger |
| 5,936,756 A | 8/1999 | Nakajima |
| 6,163,378 A | 12/2000 | Khoury |
| 6,317,202 B1 | 11/2001 | Hosokawa et al. |
| 6,593,582 B2 | 7/2003 | Lee et al. |
| 6,594,000 B2 | 7/2003 | Green |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di |
| 7,489,865 B2 | 2/2009 | Varshneya |
| 7,576,837 B2 | 8/2009 | Liu |
| 7,830,527 B2 | 11/2010 | Chen |
| 7,835,068 B1 | 11/2010 | Brooks |
| 7,847,235 B2 | 12/2010 | Krupkin |
| 7,880,865 B2 | 2/2011 | Tanaka et al. |
| 7,936,448 B2 | 5/2011 | Albuquerque |
| 7,969,558 B2 | 6/2011 | Hall |
| 7,982,861 B2 | 7/2011 | Abshire |
| 8,072,582 B2 | 12/2011 | Meneely |
| 8,471,895 B2 | 6/2013 | Banks |
| 8,736,818 B2 | 5/2014 | Weimer |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver |
| 9,194,701 B2 | 11/2015 | Bosch |
| 9,255,790 B2 | 2/2016 | Zhu |
| 9,279,662 B2 | 3/2016 | Steffey et al. |
| 9,300,321 B2 | 3/2016 | Zalik |
| 9,304,316 B2 | 4/2016 | Weiss et al. |
| 9,316,724 B2 | 4/2016 | Gehring et al. |
| 9,354,485 B2 | 5/2016 | Fermann |
| 9,465,175 B2 | 10/2016 | Shi et al. |
| 9,510,505 B2 | 12/2016 | Halloran |
| 9,529,083 B2 * | 12/2016 | Bridges ................. G01S 7/4817 |
| 9,575,184 B2 | 2/2017 | Gilliland |
| 9,605,998 B2 | 3/2017 | Nozawa |
| 9,621,876 B2 | 4/2017 | Federspiel |
| 9,638,799 B2 | 5/2017 | Goodwin |
| 9,696,426 B2 | 7/2017 | Zuk |
| 9,702,966 B2 | 7/2017 | Batcheller |
| 9,804,264 B2 | 10/2017 | Villeneuve et al. |
| 9,810,776 B2 | 11/2017 | Sapir |
| 9,810,786 B1 | 11/2017 | Welford et al. |
| 9,812,838 B2 | 11/2017 | Villeneuve et al. |
| 9,823,353 B2 * | 11/2017 | Eichenholz ....... H01S 3/094042 |
| 9,857,468 B1 | 1/2018 | Eichenholz et al. |
| 9,869,754 B1 | 1/2018 | Campbell et al. |
| 9,879,990 B2 | 1/2018 | Klepsvik et al. |
| 9,880,263 B2 | 1/2018 | Droz |
| 9,880,278 B2 | 1/2018 | Uffelen et al. |
| 9,885,778 B2 | 2/2018 | Dussan |
| 9,897,689 B2 | 2/2018 | Dussan |
| 9,910,139 B2 | 3/2018 | Pennecot et al. |
| 9,915,726 B2 | 3/2018 | Bailey |
| 9,927,915 B2 | 3/2018 | Frame |
| 9,958,545 B2 | 5/2018 | Eichenholz et al. |
| 9,989,629 B1 | 6/2018 | LaChapelle |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn |
| 10,191,155 B2 | 1/2019 | Curatu |
| 10,215,847 B2 | 2/2019 | Scheim |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik |
| 10,557,940 B2 | 2/2020 | Eichenholz et al. |
| 10,571,567 B2 | 2/2020 | Campbell et al. |
| 10,578,720 B2 | 3/2020 | Hughes et al. |
| 10,591,600 B2 | 3/2020 | Villeneuve |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 | 8/2020 | LaChapelle |
| 10,852,398 B2 * | 12/2020 | Yu ........................ H01S 3/06725 |
| 10,908,262 B2 | 2/2021 | Dussan |
| 10,908,265 B2 | 2/2021 | Dussan |
| 10,908,268 B2 | 2/2021 | Zhou et al. |
| 10,983,218 B2 | 4/2021 | Hall et al. |
| 11,002,835 B2 | 5/2021 | Pan et al. |
| 11,016,192 B2 | 5/2021 | Pacala et al. |
| 11,194,048 B1 | 12/2021 | Burbank et al. |
| 2002/0136251 A1 | 9/2002 | Green |
| 2002/0149757 A1 | 10/2002 | Kelsey et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |

(56) References Cited

U.S. PATENT DOCUMENTS

| | | |
|---|---|---|
| 2006/0071846 A1 | 4/2006 | Yanagisawa et al. |
| 2006/0132752 A1 | 6/2006 | Kane |
| 2007/0091948 A1 | 4/2007 | Di |
| 2007/0188735 A1 | 8/2007 | Braunecker et al. |
| 2007/0216995 A1 | 9/2007 | Bollond et al. |
| 2008/0037028 A1 | 2/2008 | Cheung et al. |
| 2008/0074640 A1 | 3/2008 | Walsh et al. |
| 2008/0174762 A1 | 7/2008 | Liu |
| 2008/0192228 A1 | 8/2008 | Eaton |
| 2008/0193135 A1 | 8/2008 | Du et al. |
| 2009/0010644 A1 | 1/2009 | Varshneya |
| 2009/0028193 A1 | 1/2009 | Islam |
| 2009/0051926 A1 | 2/2009 | Chen |
| 2009/0059201 A1 | 3/2009 | Willner |
| 2009/0067453 A1 | 3/2009 | Mizuuchi et al. |
| 2009/0142066 A1 | 6/2009 | Leclair et al. |
| 2009/0147239 A1 | 6/2009 | Zhu |
| 2009/0262760 A1 | 10/2009 | Krupkin |
| 2009/0316134 A1 | 12/2009 | Michael et al. |
| 2010/0006760 A1 | 1/2010 | Lee |
| 2010/0020306 A1 | 1/2010 | Hall |
| 2010/0020377 A1 | 1/2010 | Brochers et al. |
| 2010/0027602 A1 | 2/2010 | Abshire |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque |
| 2011/0181864 A1 | 7/2011 | Schmitt et al. |
| 2011/0185935 A1 | 8/2011 | Jennings et al. |
| 2011/0216792 A1 | 9/2011 | Chann et al. |
| 2011/0306956 A1* | 12/2011 | Islam .................. A61B 18/24 606/14 |
| 2012/0038903 A1 | 2/2012 | Weimer |
| 2012/0124113 A1 | 5/2012 | Zalik |
| 2012/0162749 A1 | 6/2012 | Gusev et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu |
| 2013/0293946 A1 | 11/2013 | Fermann |
| 2013/0314694 A1 | 11/2013 | Tchoryk, Jr. et al. |
| 2013/0329279 A1 | 12/2013 | Nati et al. |
| 2013/0342822 A1 | 12/2013 | Shiraishi |
| 2014/0036252 A1 | 2/2014 | Amzajerdian et al. |
| 2014/0078514 A1 | 3/2014 | Zhu |
| 2014/0104594 A1 | 4/2014 | Gammenthaler |
| 2014/0226140 A1 | 8/2014 | Chuang et al. |
| 2014/0347650 A1 | 11/2014 | Bosch |
| 2014/0350836 A1 | 11/2014 | Stettner et al. |
| 2015/0078123 A1 | 3/2015 | Batcheller |
| 2015/0084805 A1 | 3/2015 | Dawber |
| 2015/0109603 A1 | 4/2015 | Kim et al. |
| 2015/0116692 A1 | 4/2015 | Zuk |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin |
| 2016/0003946 A1 | 1/2016 | Gilliland |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran |
| 2016/0117048 A1 | 4/2016 | Frame |
| 2016/0139266 A1 | 5/2016 | Montoya et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0259038 A1 | 9/2016 | Retterath et al. |
| 2016/0273034 A1 | 9/2016 | Lundquist et al. |
| 2016/0291134 A1 | 10/2016 | Droz |
| 2016/0313445 A1 | 10/2016 | Bailey |
| 2016/0327646 A1 | 11/2016 | Scheim |
| 2016/0377721 A1 | 12/2016 | Lardin et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz |
| 2017/0307738 A1 | 10/2017 | Schwarz et al. |
| 2017/0365105 A1 | 12/2017 | Rao et al. |
| 2018/0031678 A1* | 2/2018 | Singer .................. G01S 17/931 |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li |
| 2018/0188358 A1 | 7/2018 | Li |
| 2018/0188371 A1 | 7/2018 | Bao |
| 2018/0188447 A1* | 7/2018 | Weirich ............. G02B 6/02361 |
| 2018/0210084 A1 | 7/2018 | Zwölfer et al. |
| 2018/0275274 A1 | 9/2018 | Bao |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li |
| 2019/0107607 A1 | 4/2019 | Danziger |
| 2019/0107623 A1 | 4/2019 | Campbell et al. |
| 2019/0120942 A1 | 4/2019 | Zhang |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li |
| 2019/0265334 A1 | 8/2019 | Zhang |
| 2019/0265336 A1 | 8/2019 | Zhang |
| 2019/0265337 A1 | 8/2019 | Zhang |
| 2019/0273365 A1 | 9/2019 | Zediker et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0227882 A1 | 7/2020 | Zhang et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0341124 A1 | 10/2020 | Yu et al. |
| 2020/0400798 A1 | 12/2020 | Rezk et al. |
| 2021/0088630 A9 | 3/2021 | Zhang |
| 2021/0165169 A1 | 6/2021 | Takano et al. |
| 2022/0050187 A1* | 2/2022 | Yao .................... G01S 7/484 |

FOREIGN PATENT DOCUMENTS

| | | |
|---|---|---|
| CN | 101201403 A | 6/2008 |
| CN | 103750814 A | 4/2014 |
| CN | 103792544 A | 5/2014 |
| CN | 204216401 U | 3/2015 |
| CN | 204758260 U | 11/2015 |
| CN | 204885804 U | 12/2015 |
| CN | 205643711 U | 10/2016 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 109690383 A | 4/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |

(56) References Cited

FOREIGN PATENT DOCUMENTS

| | | |
|---|---|---|
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 10 2012 202 637 A1 | 8/2013 |
| EP | 0 757 257 A2 | 5/2002 |
| EP | 1237305 A2 | 9/2002 |
| EP | 1923721 A1 | 5/2008 |
| EP | 2157445 A2 | 2/2010 |
| EP | 2395368 A1 | 12/2011 |
| EP | 2889642 A1 | 7/2015 |
| GB | 1 427 164 A | 3/1976 |
| GB | 2000411 A | 1/1979 |
| JP | H9-297014 A | 11/1997 |
| JP | 2002221574 A | 8/2002 |
| JP | 2005009956 A | 1/2005 |
| JP | 2007144667 A | 6/2007 |
| JP | 2010035385 A | 2/2010 |
| JP | 2010085316 A | 4/2010 |
| JP | 2012026921 A | 2/2012 |
| JP | 2012-83289 A | 4/2012 |
| JP | 2015-111160 A | 6/2015 |
| JP | 2016014665 A | 1/2016 |
| JP | 2017-003347 A | 1/2017 |
| JP | 2017-138301 A | 8/2017 |
| KR | 20100096931 A | 9/2010 |
| KR | 10-2012-0013515 A | 2/2012 |
| KR | 10-2013-0068224 A | 6/2013 |
| KR | 10-2018-0107673 A | 10/2018 |
| WO | 02101408 A1 | 12/2002 |
| WO | 2004065984 A1 | 8/2004 |
| WO | 2006088822 A2 | 8/2006 |
| WO | 2010000751 A1 | 1/2010 |
| WO | 2014203654 A1 | 12/2014 |
| WO | WO-2015120118 A1 * | 8/2015 ............ H01S 5/005 |
| WO | 2018162010 A1 | 10/2016 |
| WO | 2017/110417 A1 | 6/2017 |
| WO | 2018/125725 A1 | 7/2018 |
| WO | 2018/129410 A1 | 7/2018 |
| WO | 2018126248 A1 | 7/2018 |
| WO | WO2018129408 A1 | 7/2018 |
| WO | WO2018129409 A1 | 7/2018 |
| WO | WO2018175990 A1 | 9/2018 |
| WO | WO2018182812 A2 | 10/2018 |
| WO | WO2019079642 A1 | 4/2019 |
| WO | WO2019165095 A1 | 8/2019 |
| WO | WO2019165289 A1 | 8/2019 |
| WO | WO2019165294 A1 | 8/2019 |
| WO | 2020013890 A2 | 1/2020 |

OTHER PUBLICATIONS

EP2889642 Description translation, created Oct. 3, 2020 from application dated Nov. 11, 2014, 27 pp. (Year: 2020).
European Search Report, dated Jul. 17, 2020, for EP Application No. 18776977.3, twelve pages.
Extended European Search Report, dated Jul. 10, 2020, for EP Application No. 18736738.8, nine pages.
Extended European Search Report, dated Jul. 22, 2020, for EP Application No. 18736685.1, ten pages.
Final Office Action mailed Oct. 8, 2020, for U.S. Appl. No. 15/857,563, filed Dec. 28, 2017, thirteen pages.
Gunzung, Kim, et al. (Mar. 2, 2016). "A hybrid 3D LIDAR imager based on pixel-by-pixel scanning and DS-OCDMA," Proceedings of SPIE; [Proceedings of SPIE ISSN 0277-786X vol. 10524], SPIE, US, vol. 9751, pp. 975119-1-975119-8.
International Preliminary Report on Patentability mailed Apr. 30, 2020, for PCT Application No. PCT/US2018/056577, eight pages.
J. Gluckman. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, pp. 983203-983203.
Non-Final Office Action mailed Apr. 1, 2020, for U.S. Appl. No. 15/857,566, filed Dec. 28, 2017, twenty one pages.
Non-Final Office Action mailed Apr. 30, 2020, for U.S. Appl. No. 15/860,598, filed Jan. 2, 2018, thirteen pages.
Non-Final Office Action mailed Jun. 2, 2020, for U.S. Appl. No. 15/934,807, filed Mar. 23, 2018, thirteen bages.
Non-Final Office Action mailed Mar. 26, 2020, for U.S. Appl. No. 15/857,563, filed Dec. 28, 2017, twenty three pages.
Non-Final Office Action mailed Mar. 30, 2020, for U.S. Appl. No. 15/863,695, filed Jan. 5, 2018, eight pages.
Non-Final Office Action mailed Dec. 16, 2020, for U.S. Appl. No. 15/857,566, filed Dec. 28, 2017, eight pages.
Notice of Allowance malled Dec. 2, 2020, for U.S. Appl. No. 15/863,695, filed Jan. 5, 2018, five pages.
Notice of Allowance, (corrected) mailed Jan. 8, 2021, for U.S. Appl. No. 15/863,695, filed Jan. 5, 2018, two pages.
Non-Final Office Action mailed Feb. 18, 2021, for U.S. Appl. No. 15/860,598, filed Jan. 2, 2018, thirteen pages.
Notice of Allowance mailed Mar. 26, 2021, for U.S. Appl. No. 15/857,566, filed Dec. 28, 2017, ten pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., six pages.
International Preliminary Report on Patentability and Written Opinion of the International Searching Authority, mailed Sep. 18, 2018, for PCT Application No. PCT/US2018/12116, filed Jan. 2, 2018, 10 pages.
International Preliminary Report on Patentability, and Written Opinion dated Jul. 9, 2019, for PCT Application No. PCT/US2018/012703, filed Jan. 5, 2018, 10 pages.
International Preliminary Report on Patentability, dated Jul. 9, 2019, for PCT Application No. PCT/US2018/012704, filed Jan. 5, 2018, 7 pages.
International Preliminary Report on Patentability, dated Jul. 9, 2019, for PCT Application No. PCT/US2018/012705, filed Jan. 5, 2018, 7 pages.
International Search Report and Written Opinion, dated Jul. 9, 2019, for PCT Application No. PCT/US2019/18987, 17 pages.
International Search Report and Written Opinion, dated May 3, 2019, for PCT Application No. PCT/US2019/19272, 16 pages.
International Search Report and Written Opinion, dated May 6, 2019, for PCT Application No. PCT/US2019/19264, 15 pages.
International Search Report and Written Opinion, mailed Jan. 3, 2019, for PCT Application No. PCT/US2018/056577, nine pages.
International Search Report, mailed Jun. 7, 2018, for PCT Application No. PCT/US2018/24185, filed Mar. 23, 2018, 2 pages.

(56) References Cited

OTHER PUBLICATIONS

International Search Report, mailed Mar. 19, 2018, for PCT Application No. PCT/US2018/012705, filed Jan. 5, 2018, 2 pages.
International Search Report, mailed Mar. 20, 2018, for PCT Application No. PCT/US2018/012703, filed Jan. 5, 2018, 2 pages.
International Search Report, mailed Mar. 23, 2018, for PCT Application No. PCT/US2018/012704, filed Jan. 5, 2018, 2 pages.
International Search Report, mailed Sep. 18, 2018, for PCT Application No. PCT/US2018/12116, filed Jan. 2, 2018, 2 pages.
Written Opinion of the International Searching Authority, mailed Jun. 7, 2018, for PCT Application No. PCT/US2018/24185, filed Mar. 23, 2018, 5 pages.
Written Opinion of the International Searching Authority, mailed Mar. 19, 2018, for PCT Application No. PCT/US2018/012705, filed Jan. 5, 2018, 6 pages.
Written Opinion of the International Searching Authority, mailed Mar. 20, 2018, for PCT Application No. PCT/US2018/012703, filed Jan. 5, 2018, 2 pages.
Written Opinion of the International Searching Authority, mailed Mar. 23, 2018, for PCT Application No. PCT/US2018/012704, filed Jan. 5, 2018, 6 pages.
International Search Report and Written Opinion, dated Jan. 17, 2020, for PCT Application No. PCT/US19/19276, 14 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/ (2021), 5 pages.
Johnson, Lee., "Parabolic Mirror: How It Works & Types (w/ Examples)", https://sciencing.com/parabolic-mirror-how-it-works-types-w-examples-diagram-13722364.html, Dec. 28, 2020, 14 pages.
Helser, George., "Laser damage threshold—Galvo Mirror vs Polygon mirror", https://precisionlaserscanning.com/2016/03/laser-damage-threshold-galvo-mirror-vs-polygon-mirror/, Mar. 25, 2016, 4 pages.
International Search Report and Written Opinion issued in International Application No. PCT/US21/60660 dated Feb. 8, 2022, 9 pages.
U.S. Appl. No. 62/580,419, filed Nov. 1, 2017.
European Search Report, dated Jun. 17, 2021, for EP Application No. 18868896.4, 7 pages.
Fiber laser, Wikipedia, https://en.wikipedia.org/wiki/Fiber_laser, 6 pages.
Hariyama et al., "High accuracy distance measurement under high temperature environment using two-color method," Japan Society of Applied Physics, p. 606.
Office Action Issued in Japanese Patent Application No. 2019-536019, dated Nov. 30, 2021, 6 pages.
Lei, Ming, et al. "Laser Assisted Obstacle Detection Method for Intelligent Vehicles," Journal of Xi'an Technological University, vol. 35 No. 1, Jan. 2015, pp. 39-44.
Chen, Li et al. "LiDAR technology and its application," Journal of Henan Polytechnic University (Natural Sciences), vol. 28, No. 5, Oct. 2009, pp. 583-586.

\* cited by examiner

DISTRIBUTED LiDAR SYSTEMS

CROSS-REFERENCE TO RELATED APPLICATIONS

This application claims priority to U.S. Provisional patent application Ser. No. 62/634,593, filed Feb. 23, 2018, entitled "Distributed LiDAR Systems," the content of which is hereby incorporated by reference for all purposes.

FIELD

This disclosure relates generally to laser scanning systems and, more particularly, to connectors and architectures for distributed laser scanning systems.

BACKGROUND

Light detection and ranging (LiDAR) systems use light signals (e.g., light pulses) to create a three-dimensional image or point cloud of the external environment. Some typical LiDAR systems include a light source, a signal steering system, and light detector. The light source generates pulse signals (also referred to herein as light pulses or pulses), which are directed by the signal steering system in particular directions when being transmitted from the LiDAR system. When a transmitted pulse signal is scattered by an object, some of the scattered light is returned to the LiDAR system as a returned pulse signal. The light detector detects the returned pulse signal. Using the time it took for the returned pulse to be detected after the pulse signal was transmitted and the speed of light, the LiDAR system can determine the distance to the object along the path of the transmitted light pulse. The signal steering system can direct light pulses along different paths to allow the LiDAR system to scan the surrounding environment and produce a three-dimensional image or point cloud. LiDAR systems can also use techniques other than time-of-flight and scanning to measure the surrounding environment.

SUMMARY

The following presents a simplified summary of one or more examples to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) system comprises: a light source housing; a light source mounted within the light source housing and configured to generate a pulse signal; a plurality of pre-amplifiers mounted within the light source housing and configured output an amplified pulse signal based on the pulse signal; a first laser pump configured to output a first pumping signal; a first fiber connector coupled to the light source housing and capable of outputting a first output pulse signal at a first power, wherein the first output pulse signal is based on the amplified pulse signal; a second fiber connector coupled to the light source housing and capable of outputting a second output signal based on the first pumping signal, wherein the second output signal is at a second power higher than the first power; a LiDAR head housing separate from the light source housing; a first fiber coupled to the LiDAR head housing and couplable to the first fiber connector; a second fiber to the LiDAR head housing and couplable to the second fiber connector; a combiner mounted in the LiDAR head housing and coupled to the first fiber and the second fiber, wherein the combiner is configured to produce a third output signal based on the first output pulse signal and the second output signal; and an amplifier mounted in the LiDAR head housing and configured to amplify the third output pulse signal to produce an amplified output pulse signal.

In accordance with some embodiments, a light detection and ranging (LiDAR) system comprises: a control system housing; a first LiDAR head housing separate and distinct from the control system housing; a light source within the control system housing, the light source configured to produce a first pulse signal; a light detector within the control system housing configured to detect a first return pulse signal associated with the pulse signal; a first pulse steering system within the first LiDAR housing, the first pulse steering system configured to direct the first pulse signal in a first direction; a first fiber coupled to the light source and the first pulse steering system, the first fiber configured to carry the first pulse signal from the light source to the first pulse steering system; and a second fiber coupled to the light detector and the first pulse steering system, the second fiber configured to carry a first returned pulse signal from the first LiDAR head housing to the light detector.

In accordance with some embodiments, a method comprises: producing, using a light source within a control system housing, a first pulse signal; transmitting, using a first fiber coupled to the light source and a first steering system, the first pulse signal from the light source to the first pulse steering system, wherein the first pulse steering system is within a first LiDAR head housing separate and distinct from the control system housing; directing, using the first pulse steering system, the first pulse signal in a first direction; transmitting, using a second fiber coupled to the light detector and the first pulse steering system, a first returned pulse signal associated with the pulse signal from the first LiDAR head housing to a light detector, wherein the light detector is within the control system housing; and detecting, using the light detector, the first return pulse signal associated with the pulse signal.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
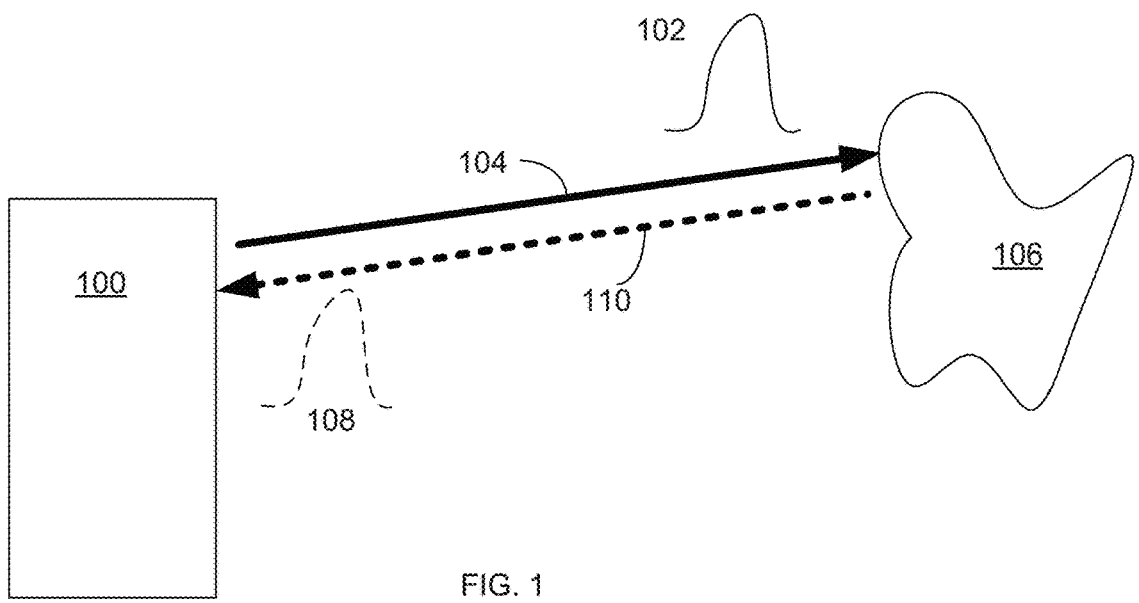
FIG. 1 illustrates an exemplary LiDAR system using pulse signal to measure distances to points in the outside environment.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Currently, a typical LiDAR system has a single light source for providing light signals to a LiDAR head and a single light detector for detecting returned pulses. Further, the light source, the LiDAR head, and the light detector are placed in the same housing. This type of integrated system works but has several disadvantages. For example, when multiple LiDAR heads are needed (e.g., to detect the environment on all sides of a vehicle), multiple integrated systems, each of which also includes a light source and a light detector, would be needed. Because components such as light sources may be expensive, adding LiDAR heads can become prohibitively expensive.

Moreover, when all of the components in the LiDAR system are integrated into a single housing, the housing becomes large and cumbersome, making the LiDAR system potentially difficult to be mounted on a support (e.g., a vehicle). Furthermore, replacing a LiDAR head would also require replacing the entire LiDAR system. Further still, an integrated system also requires all components be located in the same environment. However, different types of components often have different tolerances to the environment. For example, the light source such as a laser may need a cooled environment while the signal steering system can handle a much warmer environment and may even produce enough heat to warm its surrounding environment, making the environment unsuited for operating the light source.

Nevertheless, physically separating the LiDAR head from the rest of the LiDAR system can introduce several difficulties. For example, high-power connectors that provide a connection between the light source and the LiDAR head can be expensive and/or cause power loss in the light signals.

In some embodiments of the present technology, the LiDAR head, which includes a signal steering system among other things, is physically separated from the light source and the light detector. Specifically, the LiDAR head is connected to the rest of the LiDAR system via a plurality of industry standard connectors. This provides for several potential benefits. For example, the configuration allows for use of connectors that are industry standard and/or cheaper. The connectors also allow for easier connection and disconnection of LiDAR heads from the rest of the system (as opposed to using a splicer). Any number of LiDAR heads can be added to the system without having to add additional light sources and/or light detectors (multiple LiDAR heads can share a light source and/or light detector). As another example, the LiDAR heads can be placed in an environment different from the light source and/or the light detector, which may make it easier to maintain the light source and/or the light detector in the appropriated environment (e.g., a cooler environment). As yet another example, given the smaller size of a LiDAR head, it is easier to mount multiple LiDAR heads to a given support (e.g., a vehicle) than mounting an entire LiDAR system.

Separating LiDAR heads from the rest of the LiDAR system also has the potential benefit of allowing for easier repair and/or replacement of the LiDAR heads. The benefit is provided by embodiments of the present technology that enable the use of industry standard fiber connectors connecting a LiDAR head to the rest of the LiDAR system. By separating the light pulse delivery into two fibers (a lower power, single mode fiber and a high power, multimode fiber) connected to the LiDAR head, existing industry standard connectors can be used. The pulse delivered on the lower power, single-mode fiber to the LiDAR head can then be boosted in the LiDAR head based on the power provide via the high power, multimode fiber.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed and/use derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
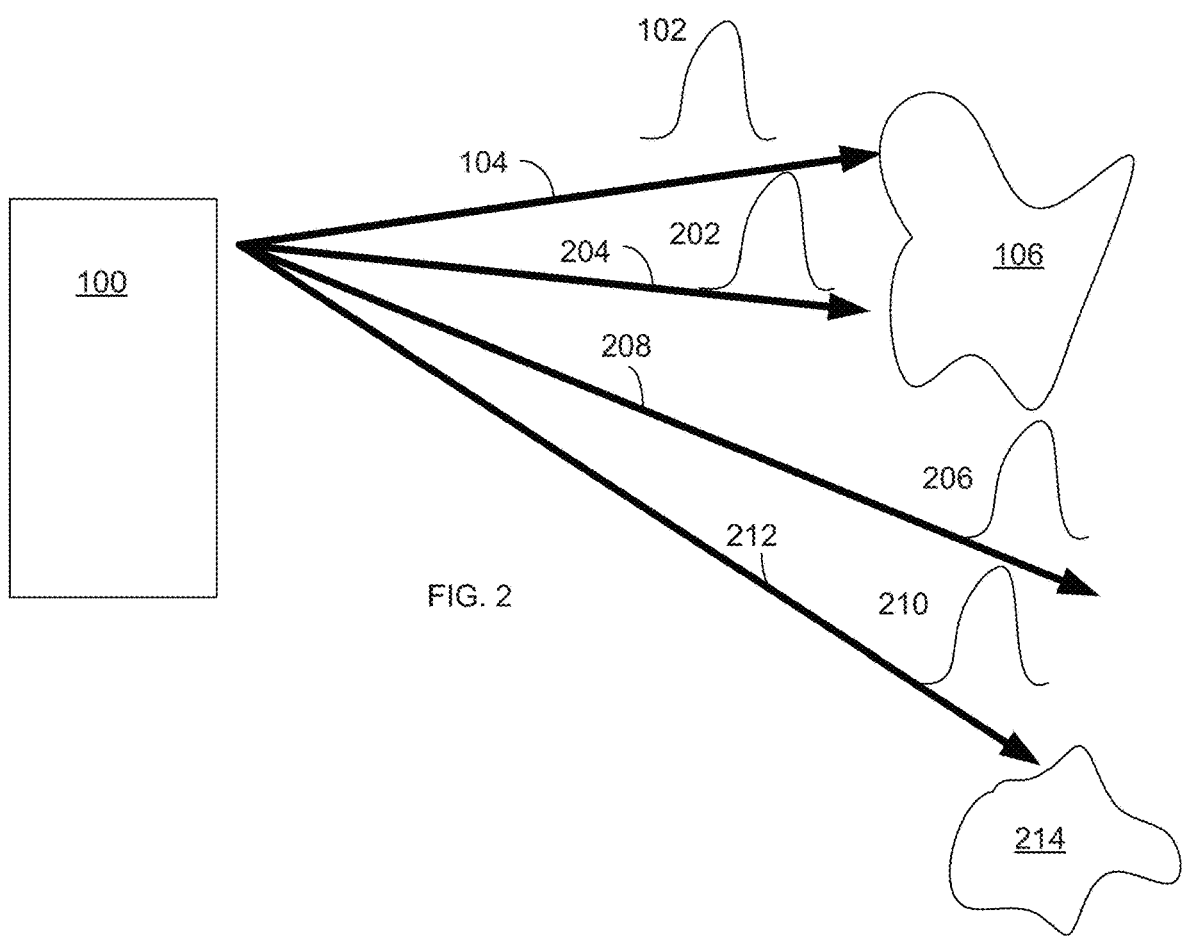
FIG. 2 illustrates the exemplary LiDAR system using pulse signal to measure distances to points in the outside environment.
Figure 3:
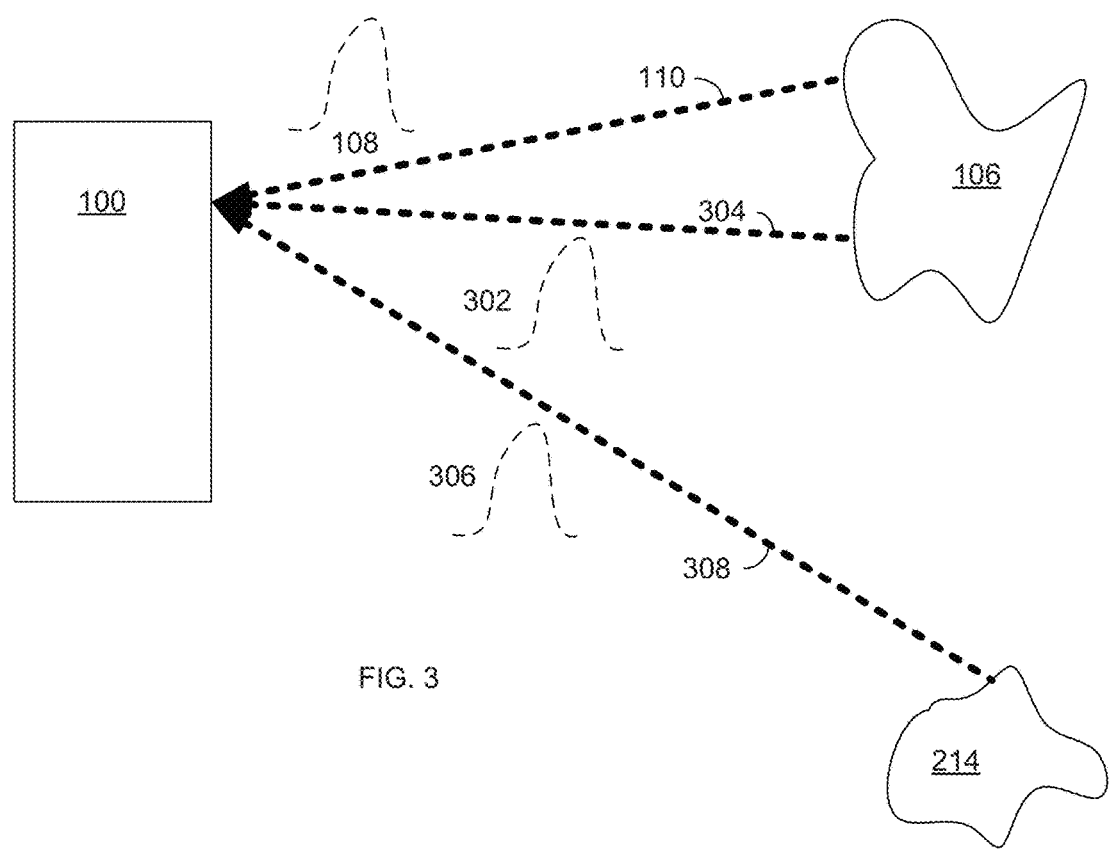
FIG. 3 illustrates the exemplary LiDAR system using pulse signal to measure distances to points in the outside environment.

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimentional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
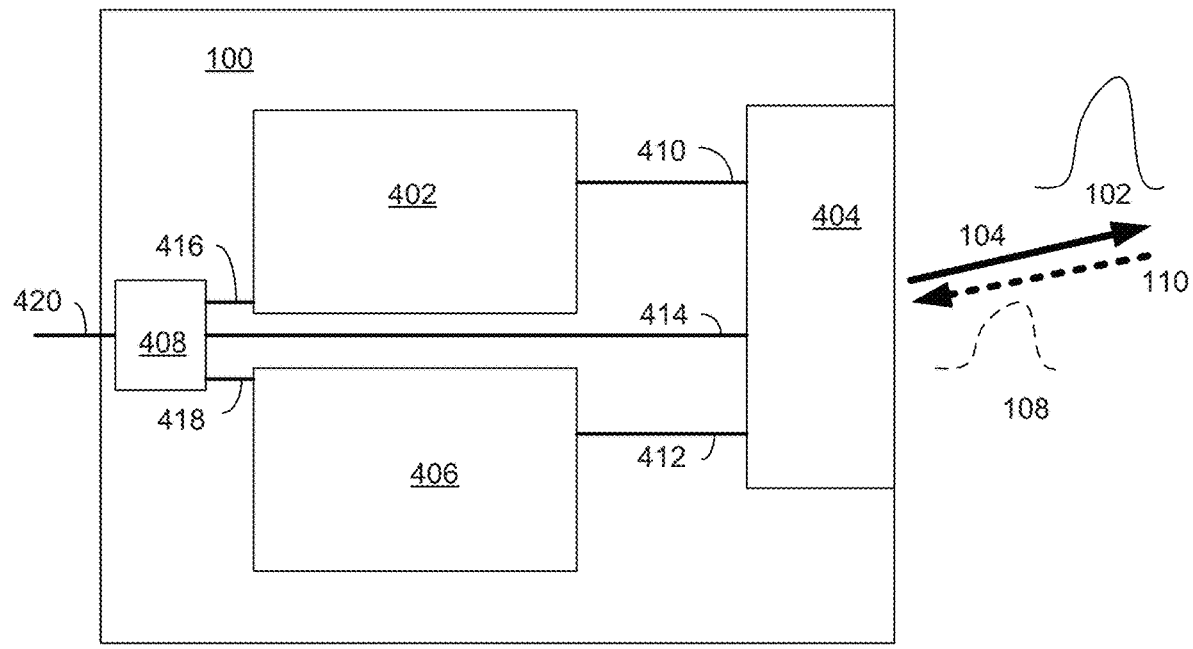
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
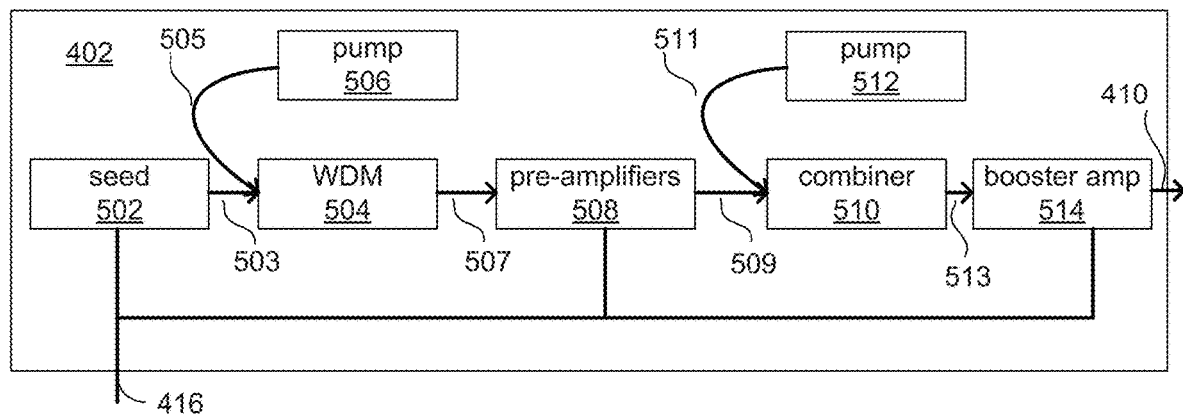
FIG. 5 depicts a light source of the exemplary LiDAR system.

FIG. 5 depicts a logical block diagram of one example of light source 402 that is based on a laser fiber, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. patent application Ser. No. 15/721,127 filed on Sep. 29, 2017, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
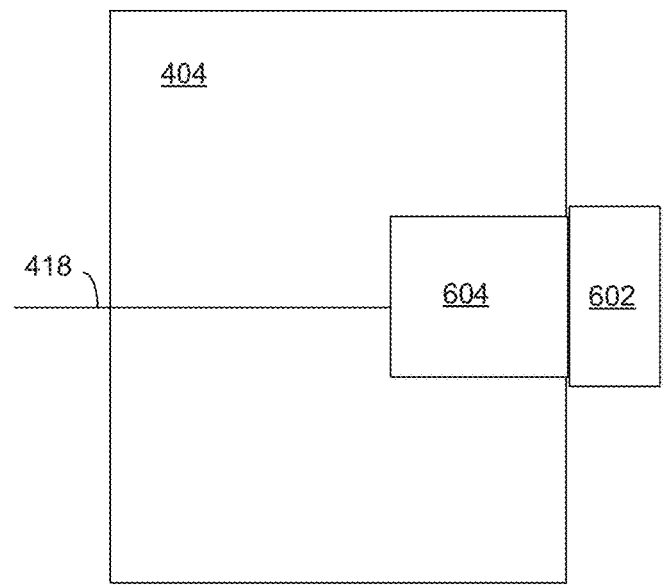
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 404 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
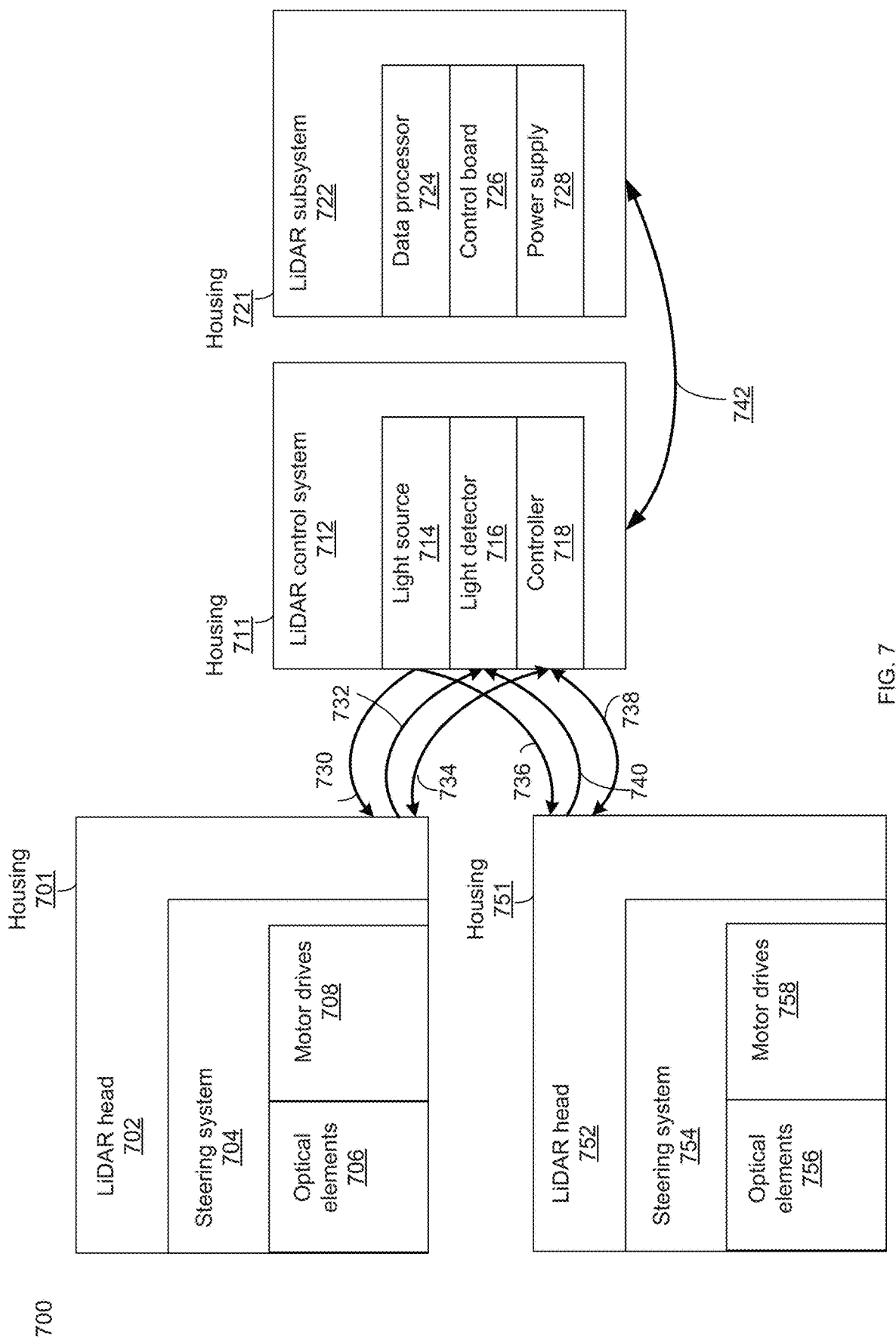
FIG. 7 depicts an embodiment of a distributed LiDAR system.

FIG. 7 depicts LiDAR system 700 according to some embodiments of the present technology for physically separating the one or more LiDAR heads from the rest of the LiDAR system (e.g., light sources and light detectors). LiDAR system 700 includes a first LiDAR head 702 placed within housing 701, and a second LiDAR head 752 placed within housing 751. LiDAR head 702 includes signal steering system 704 that uses motor drives 708 to move optical elements 706 so that pulses transmitted from LiDAR head 702 are directed in various directions to enable mapping of the environment around the system. Similarly, LiDAR head 752 includes pulse steering system 754 that uses motor drives 758 to move optical elements 756 so that pulses transmitted from LiDAR head 752 are directed in various directions to enable mapping of the environment around the system.

LiDAR control system 712 is housed in housing 711 that is separate and distinct from LiDAR head housings 701 and 751. LiDAR control system 712 includes light source 714 (such as the light source described with respect to FIG. 5), light detector 716 (such as the light detector described with respect to FIG. 6), and controller 718 (such as controller 408 described above). In the example of FIG. 7, these three components are all placed within housing 711. In other examples, the components could be placed in multiple housings separated from each other. Additionally, housing 711 and/or LiDAR control system 712 could include other components.

LiDAR control system 712 supplies light signals (e.g., light pulses) generated from light source 714 to LiDAR heads 702 and 752 via fibers 730 and 736, respectively. Each of fibers 730 and 736 may be a single fiber or multiple fibers (e.g., see description of multi-fiber connections with respect to FIG. 8). Returned pulses received at LiDAR heads 702 and 752 are directed to light detector 716 via fibers 732 and 740, respectively. Each of fibers 732 and 740 may be a single fiber or multiple fibers. The returned pulses are optionally directed or redirected by steering systems 704 or 754. In some examples, however, returned pulses bypass the steering systems all together.

Controller 718 contains firmware and/or other software for controlling LiDAR heads 702 and 752 via communication lines 734 and 738, respectively. Controller 718 optionally also receives information (e.g., registration data, status data, etc.) from LiDAR heads 702 and 752 via these communication lines. Controller 718 optionally also controls light source 714 and light detector 716 via communication lines that are not shown.

LiDAR subsystem 722 includes data processor 724, control board 726, and power supply 728, which are all housed within housing 721. While the housing 711 and housing 721 are depicted as separate and distinct housings, in other examples of the present technology, the components of LiDAR subsystem 722 and LiDAR control system 712 can be placed into one or more housings in any combination. LiDAR subsystem 722 provides power and control information via communication lines 742 and also receives data back from LiDAR control system 712 (e.g., estimated ranges, timing of transmitted and returned pulses, etc.).

In some embodiments, LiDAR heads 702 and 752 do not contain any optically active elements (e.g., amplifiers, pumps, laser sources, etc.). In other embodiments (e.g., see FIG. 8) LiDAR heads 702 and 752 include some of these elements, such as the elements for amplifying a light pulse before it is transmitted by the steering system(s).

The separation of LiDAR heads 702 and 752 from LiDAR control system 712, LiDAR subsystem 722, and particularly light source 714 and/or light detector 716 allows for any of LiDAR control system 712's and/or LiDAR subsystem 722's components to be held in a different environment than the LiDAR heads. For example, light source 714 and light detector 716 can be held in a controlled environment (e.g., a specific temperature or temperature range) while LiDAR heads 702 and 752 can be held in an uncontrolled environment (e.g., exposed to the outside so that the temperature fluctuates with the outside temperature).

Figure 8:
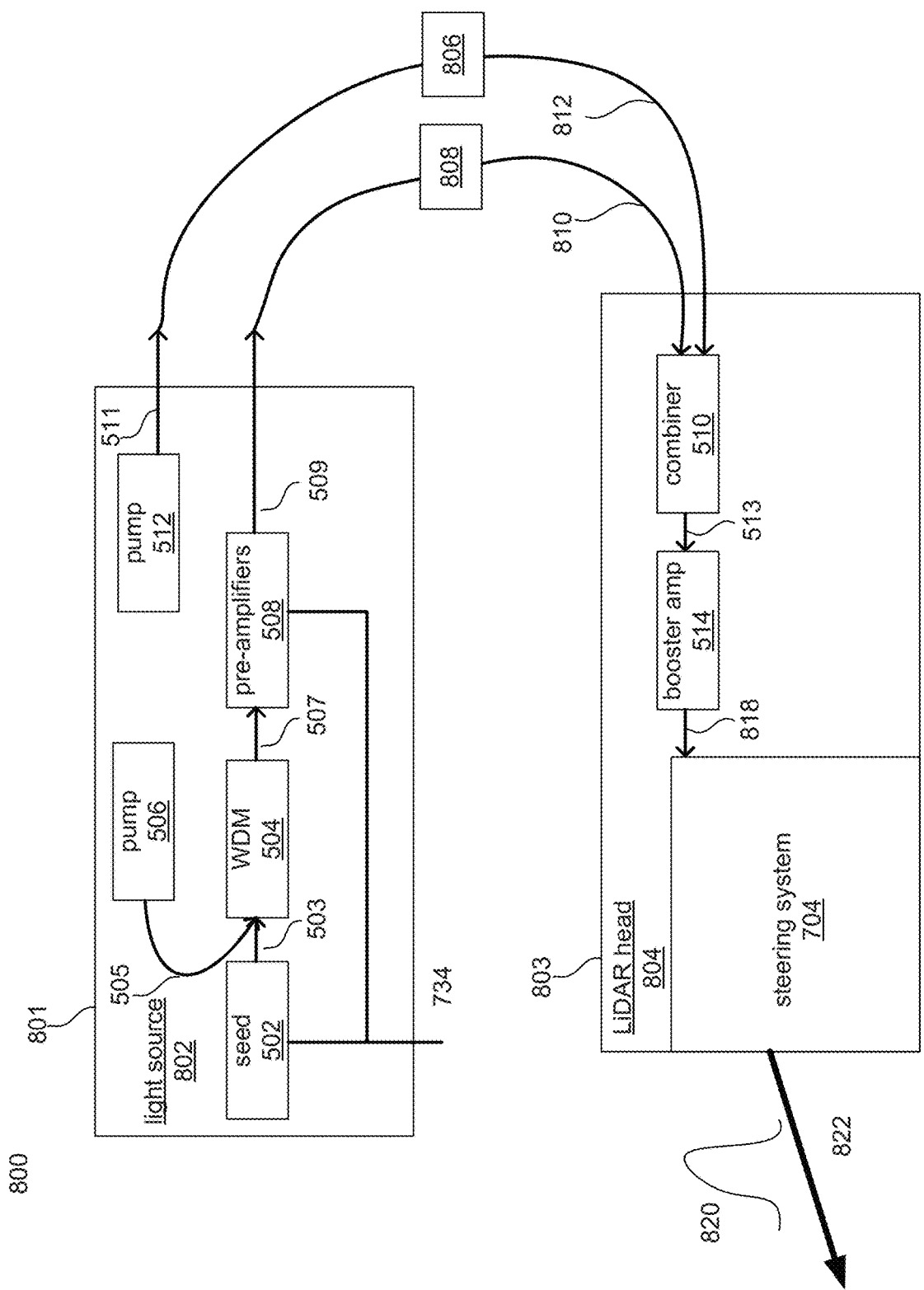
FIG. 8 depicts an embodiment of a fiber connection system for easy connection and disconnection of a LiDAR head.

FIG. 8 depicts LiDAR system 800 implementing an embodiment of the present technology that allows for simplified connection of LiDAR heads to the rest of the LiDAR system. While LiDAR system 800 only has a single LiDAR head, the connection technique in LiDAR system 800 is extendable to any number of LiDAR heads by splitting the output of light source 802 to deliver pulses and CW power to multiple LiDAR heads. For example, the connection technology described with respect to LiDAR system 800 can be used to implement LiDAR system 700 of FIG. 7.

LiDAR system 800 includes light source 802 and LiDAR head 804. Light source 802 includes many of the same components as light source 402 of FIG. 5. One difference is that housing 801 for light source 802 does not include the final stages that are included in light source 402 (i.e., combiner 510 and booster amp 514). Instead, light source 802 provides two fibers, fiber 511 and fiber 509, that carry two outputs respectively. Fiber 511 is a high power multimode fiber that can handle up to hundreds of watts output due to large fiber core size. Some implementations of fiber 511 are about 100μ or are 50μ-300μ in diameter. Pump 512 is configured to provide a CW signal of up to 15 W (or up to 20 W, 30 W, 40 W, or 50 W) or from 5 W to 15 W. Fiber 509 is a low power fiber. Optionally, fiber 509 is a single mode fiber. Some implementations of fiber 511 are about 8μ or are 5μ-10μ in diameter. In some cases, pre-amplifiers 508 are configured to provide pulses of less than 300 mW on fiber 509.

The signals provided on fiber 509 and fiber 511 are coupled to fiber 810 and fiber 812, respectively, via connectors 808 and 806, respectively. One benefit of separating the fiber sources is that the final laser power required by LiDAR system 100 may exceed maximum power limit of a single mode fiber connector. Connectors enable easy system assembly and disassembly (e.g., for maintenance or replacement), especially for field engineers or customers. But many cost-efficient and low-loss single mode connectors cannot handle power higher than a few hundred milliwatts (300 mW). In some examples, the laser power needed by LiDAR system 100 may exceed this limit. By separating the fiber sources, a high power CW pump laser signal is delivered by multimode fiber 511 and connector 808, which can handle up to hundreds of watts. A low power signal, e.g. less than 300 mW, is delivered by single mode fiber 509 and connector 806. In some examples, in LiDAR head 804 a pump signal on fiber 812 (delivered from fiber 511) and a light signal on fiber 810 (delivered by fiber 509) are combined by combiner 510 and the signal is amplified by booster amp 514 to reach the required power level. This avoids the expense and complexity of having custom made connectors necessary to handle the higher power pulse signal that is eventually generated from booster amp 514 on fiber 818. Steering system 704 (as described with respect to FIG. 7 and more generally above with respect to pulse steering system 404) directs pulse 820 that was generated from booster amp 514 along optical path 822.

While connectors 808 and 806 are depicted as not being part of either light source 802 or LiDAR head 804, in other examples, these connectors could be mounted on housing 801 or 803, respectively (or are at least be an integrated part of light source 802 or LiDAR head 804). Additionally, more than one set of connectors may be present (e.g., one set that is a part of light source 802 and one set that is a part of LiDAR head 804 with a patch fiber cable connecting the two connectors). The use of connectors in LiDAR system 800 allows for a design that avoids the need for a splicing tool when connecting LiDAR head 804 to light source 802.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

The invention claimed is:

1. A light detection and ranging (LiDAR) system comprising:
   a control system housing;
   a first LiDAR head housing separate and distinct from the control system housing;
   a light source within the control system housing, the light source configured to produce a first pulse signal and a first continuous wave (CW) signal;
   a first pulse steering system within the first LiDAR head housing, the first pulse steering system configured to direct the first pulse signal in a first direction to an external environment;
   a light detector within the control system housing configured to detect a first returned pulse signal associated with the first pulse signal and received from the external environment;
   a first fiber comprising a first pulse signal output fiber and a first fiber connector, the first pulse signal output fiber being coupled to the light source and the first fiber connector, wherein the first fiber connector is coupled to the first pulse steering system, the first fiber configured to carry the first pulse signal from the light source to the first pulse steering system;
   a first CW fiber comprising a first CW output fiber and a first CW fiber connector, the first CW fiber being coupled to the light source and the first CW fiber connector, wherein the first CW output fiber comprises a multimode fiber and the first CW fiber connector is coupled to the first pulse steering system, the first CW fiber configured to carry the first CW signal from the light source to the first pulse steering system; and
   a second fiber comprising a first pulse signal return fiber and a second fiber connector, the first pulse signal return fiber being coupled to the light detector and the second fiber connector, wherein the second fiber connector is coupled to the first pulse steering system, the second fiber configured to carry the first returned pulse signal from the first LiDAR head housing to the light detector, wherein at least one of the first pulse signal and the first returned pulse signal is at a power no higher than 300 mW and at least one of the first fiber and the second fiber comprises a single mode fiber.

2. The LiDAR system of claim 1, wherein the light source is further configured to produce a second pulse signal and the light detector is further configured to detect a second returned pulse signal associated with the second pulse signal, the system further comprising:

a second LiDAR head housing separate and distinct from the control system housing and the first LiDAR head housing;

a second pulse steering system within the second LiDAR head housing, the second pulse steering system configured to direct the second pulse signal and a second CW signal in a second direction to the external environment;

a third fiber comprising a second pulse signal output fiber and a third fiber connector, the second pulse signal output fiber coupled to the light source and the third fiber connector, wherein the third fiber connector is coupled to the second pulse signal output fiber and the second pulse steering system, the third fiber configured to carry the second pulse signal from the light source to the second pulse steering system;

a second CW fiber comprising a second CW output fiber and a second CW fiber connector, the second CW fiber being coupled to the light source and the second CW fiber connector, wherein the second CW output fiber comprises a multimode fiber and the second CW fiber connector is coupled to the first pulse steering system, the second CW fiber configured to carry the second CW signal from the light source to the second pulse steering system; and a fourth fiber comprising a second pulse signal return fiber and a fourth fiber connector, the second pulse signal return fiber coupled to the light detector and the fourth fiber connector, wherein the fourth fiber connector is coupled to the second pulse signal return fiber and the second pulse steering system, the fourth fiber configured to carry the second returned pulse signal from the second pulse steering system to the light detector, wherein the second returned pulse signal is received from the external environment, wherein at least one of the second pulse signal and the second returned pulse signal is at a power no higher than 300 mW and at least one of the third fiber and the fourth fiber comprises a single mode fiber.

3. The LiDAR system of claim 1, further comprising:
a controller within the control system housing, the controller electrically coupled to the first pulse steering system and configured to set at least one operational parameter of the first pulse steering system.

4. The LiDAR system of claim 2, further comprising:
a controller within the control system housing, the controller electrically coupled to the second pulse steering system and configured to set at least one operational parameter of the second pulse steering system.

5. The LiDAR system of claim 4, wherein the controller is electrically coupled to the first pulse steering system and configured to set at least one operational parameter of the first pulse steering system.

6. The LiDAR system of claim 3, wherein the controller is configured to receive range or directional data from the first pulse steering system.

7. The LiDAR system of claim 1, wherein the control system housing is temperature controlled or configured to be in a temperature controlled environment.

8. The LiDAR system of claim 1, wherein the first LiDAR head housing is not temperature controlled or in a temperature controlled environment.

9. The LiDAR system of claim 1, wherein the first pulse steering system is configured to receive the first returned pulse signal.

10. The LiDAR system of claim 1, wherein the LiDAR system is configured so that the first returned pulse signal bypasses the first pulse steering system.

11. The LiDAR system of claim 2, further comprising:
a third LiDAR head housing separate and distinct from the control system housing and the first and second LiDAR head housing; and
a third pulse steering system within the third LiDAR head housing, the third pulse steering system configured to direct a third pulse signal in a third direction to the external environment, wherein the third pulse steering system is coupled to the light source via a plurality of fibers and a plurality of fiber connectors.

12. A method comprising:
producing, using a light source within a control system housing, a first pulse signal and a first continuous wave (CW) signal;
transmitting, using a first fiber comprising a first pulse signal output fiber and a first fiber connector, the first pulse signal output fiber coupled to the light source and the first fiber connector, wherein the first fiber connector is coupled to the first pulse signal output fiber and a first pulse steering system, the first pulse signal being carried from the light source to the first pulse steering system via the first fiber, wherein the first pulse steering system is within a first LiDAR head housing separate and distinct from the control system housing;
transmitting, using a first CW fiber comprising a first CW output fiber and a first CW fiber connector, the first CW fiber being coupled to the light source and the first CW fiber connector, wherein the first CW output fiber comprises a multimode fiber and the first CW fiber connector is coupled to the first pulse steering system, the first CW signal being carried from the light source to the first pulse steering system;
directing, using the first pulse steering system, the first pulse signal in a first direction to an external environment;
receiving, using the first pulse steering system, a first returned pulse signal from the external environment wherein the first returned pulse signal is associated with the first pulse signal;
transmitting the first returned pulse signal from the first LiDAR head housing to a light detector within the control system housing, using a second fiber comprising a first pulse signal return fiber and a second fiber connector, the first pulse signal return fiber being coupled to the light detector and the second fiber connector, wherein the second fiber connector is coupled to the first pulse signal return fiber and the first pulse steering system; and
detecting, using the light detector, the first returned pulse signal associated with the first pulse signal,
wherein at least one of the first pulse signal and the first returned pulse signal is at a power no higher than 300 mW, at least one of the first fiber and the second fiber comprises a single mode fiber, and at least one of the first fiber connector or the second fiber connector has a power capacity no higher than 300 mW.

13. The method of claim 12, further comprising:
producing, using the light source, a second pulse signal and a second CW signal;
transmitting the second pulse signal from the light source to a second pulse steering system within a second LiDAR head housing, using a third fiber comprising a second pulse signal output fiber and a third fiber connector, the second pulse signal output fiber being coupled to the light source and the third fiber connector, wherein the third fiber connector is coupled to the second pulse signal output fiber and the second pulse steering system, wherein the second LiDAR head housing is separate and distinct from the control system housing and the first LiDAR head housing;
transmitting, using a second CW fiber comprising a second CW output fiber and a second CW fiber connector, the second CW fiber being coupled to the light source and the second CW fiber connector, wherein the second CW output fiber comprises a multimode fiber and the second CW fiber connector is coupled to the second pulse steering system, the second CW signal being carried from the light source to the second pulse steering system;
directing, using the second pulse steering system, the second pulse signal in a second direction to the external environment;
receiving, using the second pulse steering system, a second returned pulse signal from the external environment wherein the second returned pulse signal is associated with the second pulse signal;
transmitting the second returned pulse signal from the second pulse steering system to the light detector, using a fourth fiber comprising a second pulse signal return fiber and a fourth fiber connector, the second pulse signal return fiber being coupled to the light detector and the fourth fiber connector, wherein the fourth fiber connector is coupled to the second pulse signal return fiber and the second pulse steering system; and
detecting, using the light detector, the second returned pulse signal,
wherein at least one of the second pulse signal and the second returned pulse signal is at a power no higher than 300 mW and at least one of the first fiber and the second fiber comprises a single mode fiber.

14. The method of claim 12, further comprising:
setting, using a controller within the control system housing, at least one operational parameter of the first pulse steering system, wherein the controller is electrically coupled to the first pulse steering system.

15. The method of claim 13, further comprising:
setting, using a controller within the control system housing, at least one operational parameter of the second pulse steering system, wherein the controller is electrically coupled to the second pulse steering system.

16. The method of claim 15, wherein the controller is configured to receive range or directional data from the first pulse steering system.

17. The method of claim 12, wherein the control system housing is temperature controlled or configured to be in a temperature controlled environment.

18. The method of claim 12, wherein the first LiDAR head housing is not temperature controlled or in a temperature controlled environment.

19. The method of claim 12, wherein the first pulse steering system is configured to receive the first returned pulse signal.

20. The method of claim 12, wherein the LiDAR system is configured so that the first returned pulse signal bypasses the first pulse steering system.

21. A light detection and ranging (LiDAR) system comprising:
a light source configured to produce a first pulse signal and a first continuous wave (CW) signal for transmission to an external environment;
a light detector configured to detect a first returned pulse signal associated with the first pulse signal wherein the first returned pulse signal is received from the external environment;
a first LiDAR head housing separate and distinct from the light source and the light detector;
a first pulse steering system within the first LiDAR head housing, the first pulse steering system being configured to direct the first pulse signal in a first direction to the external environment;
a first fiber comprising a first pulse signal output fiber and a first fiber connector, the first pulse signal output fiber being coupled to the light source and the first fiber connector, wherein the first fiber connector is coupled to the first pulse steering system, the first fiber being configured to carry the first pulse signal from the light source to the first pulse steering system;
a first CW fiber comprising a first CW output fiber and a first CW fiber connector, the first CW fiber being coupled to the light source and the first CW fiber connector, wherein the first CW output fiber comprises a multimode fiber and the first CW fiber connector is coupled to the first pulse steering system, the first CW fiber configured to carry the first CW signal from the light source to the first pulse steering system; and
a second fiber comprising a first pulse signal return fiber and a second fiber connector, the first pulse signal return fiber being coupled to the light detector and the second fiber connector, wherein the second fiber connector is coupled to the first pulse steering system, the second fiber being configured to carry the first returned pulse signal from the first LiDAR head housing to the light detector,
wherein at least one of the first pulse signal and the first returned pulse signal is at a power no higher than 300 mW and at least one of the first fiber and the second fiber comprises a single mode fiber.

22. A light detection and ranging (LiDAR) system comprising:
a control system housing;
a first LiDAR head housing separate and distinct from the control system housing;
a light source within the control system housing, the light source configured to produce a first pulse signal and a first continuous wave (CW) signal for transmission to an external environment;
a light detector within the control system housing configured to detect a first returned pulse signal associated with the first pulse signal, wherein the first returned pulse signal is received from the external environment;
a first pulse steering system within the first LiDAR head housing, the first pulse steering system comprising an optical redirection element that is configured to direct the first pulse signal in a first direction and the first returned pulse signal in a second direction;

a first fiber coupled to the light source and the first pulse steering system, the first fiber configured to carry the first pulse signal from the light source to the first pulse steering system;

a first CW fiber comprising a first CW output fiber and a first CW fiber connector, the first CW fiber being coupled to the light source and the first CW fiber connector, wherein the first CW output fiber comprises a multimode fiber and the first CW fiber connector is coupled to the first pulse steering system, the first CW fiber configured to carry the first CW signal from the light source to the first pulse steering system; and a second fiber coupled to the light detector and the first pulse steering system, the second fiber configured to carry the first returned pulse signal from the first LiDAR head housing to the light detector;

wherein at least one of the first pulse signal and the first returned pulse signal is at a power no higher than 300 mW and at least one of the first fiber and the second fiber comprises a single mode fiber.

23. The LiDAR system of claim 22, wherein the first CW fiber connector comprises a multimode connector.

24. The LiDAR system of claim 22, wherein the first fiber comprises a single mode fiber connector.

* * * * *